Patented Dec. 22, 1953

2,663,647

UNITED STATES PATENT OFFICE 2,663,647

HYDRATED LIME COMPOSITION AND PROCESS

Harry N. Huntzicker, Evanston, Ill., assignor to United States Gypsum Company, Chicago, Ill., a corporation of Illinois No Drawing. Application June 16, 1951, Serial No. 232,055

7 Claims. (Cl. 106—118)

This invention relates to lime, and more particularly to an improvement in finishing lime suitable for use in plastering operations in the building industry.

Methods of burning dolomitic limestones and their hydration at atmospheric pressure for use in a prepared finish for plastered walls are well known. Also the pressure hydration of dolomitic lime has been practiced commercially for some time. High calcium limes have generally not been used because of poor working qualities, such as low plasticity, and hence the primary interest of the building industry has centered on dolomitic lime for finishing purposes in plastering work.

When a plaster having good soaking qualities is desired, normal dolomitic hydrates, i. e. dolomitic quicklime hydrated at atmospheric pressure in a Schaffer or Clyde hydrator, have generally been used; but when stability on the finished wall is the primary consideration, a pressure-hydrated dolomitic quicklime, such as one prepared following United States Patent No. 2,408,647 to Huntzicker and Norman, has proved to be superior even though inferior in some respects with regard to soaking and hoddability qualities. As is well known, the stability of pressure-hydrated lime when applied to a wall is due to the fact that substantially all the magnesium oxide has been previously converted to the hydroxide during the pressure hydration step. The normal or atmospheric pressure type of hydration leaves the magnesium oxide substantially unreacted and when applied to a wall the magnesium oxide slowly hydrates and expands which results in frequent blistering or falling off of the finish coat. Accordingly, it has been a desire of the industry to provide a dolomitic lime possessing the working and hodding properties of normal hydrate but having the stability of the pressure hydrates.

It is therefore an object of this invention to provide a lime having improved hoddability and soaking qualities.

A further object of this invention is the provision of a lime which may be easily handled by a plasterer and readily applied to a building wall as a plaster finish.

It is a further object of this invention to provide a dolomitic lime composition which has a high degree of stability after application to a desired surface but which has good plasticity, hoddability and other desirable working qualities.

It is a still further object of this invention to provide a blend of limes having novel characteristics.

A still further object of this invention is to provide a process of preparing a novel finishing lime.

Further and additional objects will appear from the following description and the accompanying claims.

In accordance with this invention, it has been discovered that a lime having close to ideal characteristics may be prepared by thoroughly mixing or blending a normally hydrated dolomitic lime comprising essentially hydrated calcium oxide and unhydrated magnesium oxide with a pressure-hydrated dolomitic lime comprising essentially hydrated calcium oxide and hydrated magnesium oxide. The resulting blend has desirable characteristics which are not evident from a consideration of the properties of the individual components. The mixture of the normal hydrate and the pressure hydrate results in the formation of a dolomitic lime having most desirable properties with characteristics different from either of the hydrates taken alone or which could normally be expected by an average of the properties of the two.

In accordance with a preferred embodiment the composition of this invention contains the normal hydrate and the pressure hydrate in weight ratios within the range of about 1 to 3 and about 3 to 1, preferably equal proportions of each. The product has unexpectedly improved soaking characteristics, hoddability and plasticity with the danger of trouble due to subsequent hydration of the magnesium oxide greatly reduced. By normal hydrate is meant a dolomitic quicklime which has been hydrated to convert the calcium oxide to calcium hydroxide leaving the magnesium oxide substantially unhydrated. The hydration may be effected at atmospheric pressure in a Schaffer or Clyde hydrator and the product is subsequently ground to a fairly fine powder, as is well known to the art. The pressure hydrate is one prepared by hydration of burned dolomite under superatmospheric pressure, for example, as disclosed in the above referred to Patent No. 2,408,647, whereby both the calcium and magnesium oxides are hydrated. It has been found that the mixture of these two hydrated products has not only a high plasticity but also a high immediate plasticity (without soaking) which is very unusual and entirely unexpected from a consideration of the respective components. An average of the plasticity of the two ingredients would be expected but for some unaccountable reason the plasticity is, in most cases, as high or higher than either of the two limes taken separately. It would seem perhaps that the relatively minute particle size of the pressure-hydrated lime when compounded with the relatively coarser particles of the normal lime may account, in part, for this increased plasticity.

The product of this invention may be readily prepared by subjecting a first body of burned dolomite to atmospheric pressure hydration in a standard Schaffer or Clyde hydrator and grinding to a relatively coarse particle size for hydrated lime, the main purpose being to eliminate lumps. This hydration step results in the conversion of substantially all of the calcium oxide to the hydroxide but leaves the magnesium oxide substantially unconverted. A second body of burned dolomite is subjected to pressure hydration in the manner disclosed in said Patent No. 2,408,647 whereby both the calcium and magnesium oxide constituents are hydrated to the corresponding hydroxides and ball-milled to optimum plasticity. Equal parts by weight of the substantially dry superatmospheric pressure hydrate and the substantially dry atmospheric pressure hydrate are then thoroughly mixed together or blended by any suitable means in order to prepare the composition of this invention. It is preferred that the weight ratios of the two constituents range between about 1 to 3 and about 3 to 1.

The resulting product has unexpectedly improved plasticity characteristics after normal soaking periods which will be evident from a consideration of the accompanying table. This table shows Emley plasticimeter tests made on three mill batches of pressure hydrate and three corresponding mill batches of regular or normal hydrate, the calculated average plasticity of a 1 to 1 mixture of the corresponding pressure and normal hydrate, and the observed plasticity of each mixture. In all cases the limes were soaked approximately 16 hours.

*Emley plasticity of lime mixtures*

|  | Tests | | |
| --- | --- | --- | --- |
|  | No. 1 | No. 2 | No. 3 |
| 100% pressure hydrate (A) | 205 | 250 | 230 |
| 100% regular hydrate (B) | 280 | 265 | 270 |
| Calculated average of 1 to 1 mixture of A and B | 243 | 258 | 250 |
| Observed for 1 to 1 mixture of A and B | 270 | 280 | 300 |

In each of these particular instances the regular hydrate had a higher plasticity than the pressure hydrate. However, when the two were mixed in equal proportions a far greater plasticity was observed over that which would be expected by calculation. As a matter of fact, in tests No. 2 and No. 3 the mixture had a higher plasticity than either of its components.

From the above it is quite evident that a new and improved lime has been discovered as the plasticity in several cases is even higher than either of the components. Numerous field trials have been made with this lime and all users have been enthusiastic about its new properties. In addition to the improvement in plasticity the product of this invention also has good soaking qualities and good hoddability after soaking. The lime does not exhibit thin and thick layers after soaking but is uniform in character throughout. With the reduced amount of unhydrated magnesium oxide in the final product the chance for any trouble due to subsequent hydration after application to a wall has been substantially minimized.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. An improved dolomitic finishing lime comprising essentially two components one of which is a substantially fully hydrated dolomitic lime consisting essentially of hydrated calcium oxide and hydrated magnesium oxide and the other of which is a partially hydrated dolomitic lime consisting essentially of hydrated calcium oxide and of unhydrated magnesium oxide.

2. The finishing lime recited in claim 1 in which the weight ratio of the two components is between about 3 to 1 and about 1 to 3.

3. The finishing lime recited in claim 2 in which the weight ratio of the two components is about 1 to 1.

4. A process of preparing a finishing lime having improved properties which comprises hydrating under superatmospheric pressure a first body of dolomitic lime to produce a first component consisting essentially of hydrated calcium oxide and of hydrated magnesium oxide, hydrating a second body of dolomitic lime at substantially atmospheric pressure to produce a second component consisting essentially of hydrated calcium oxide but leaving the magnesium oxide therein substantially unhydrated, and thoroughly mixing the first and second components to produce the desired product.

5. The process recited in claim 4 wherein the first and second components are mixed in a weight ratio of between about 1 to 3 and about 3 to 1.

6. The process recited in claim 4 wherein the first and second components are mixed in a weight ratio of about 1 to 1.

7. The process recited in claim 4 wherein the first body is pressure-hydrated to convert substantially all of the magnesium oxide contained therein to magnesium hydroxide, wherein the second body is hydrated at substantially atmospheric pressure, and wherein the first and second components are mixed in a weight ratio of between about 1 to 3 and about 3 to 1.

HARRY N. HUNTZICKER.

References Cited in the file of this patent

UNITED STATES PATENTS

| Number | Name | Date |
| --- | --- | --- |
| 1,588,253 | Mathers et al. | June 8, 1926 |
| 2,408,324 | Loomis et al. | Sept. 24, 1946 |
| 2,408,647 | Huntzicker | Oct. 1, 1946 |